(12) United States Patent
Labraña Valdivia et al.

(10) Patent No.: US 7,052,670 B2
(45) Date of Patent: May 30, 2006

(54) METHOD FOR THE AUTOMATED MANUFACTURE OF PURE SO2 FROM SULFUR AND OXYGEN

(75) Inventors: Oscar David Labraña Valdivia, Santiago (CL); Hans Hanke Altmann, Santiago (CL)

(73) Assignee: Quimetal Industrial S.A., Santiago (CL)

( * ) Notice: Subject to any disclaimer, the term of this patent is extended or adjusted under 35 U.S.C. 154(b) by 0 days.

(21) Appl. No.: 10/601,600

(22) Filed: Jun. 24, 2003

(65) Prior Publication Data

US 2004/0086451 A1    May 6, 2004

(30) Foreign Application Priority Data

Nov. 6, 2002    (CL) .............................. 2545-2002

(51) Int. Cl.
    C01B 17/54    (2006.01)
(52) U.S. Cl. ............ 423/543; 423/DIG. 5; 423/DIG. 6
(58) Field of Classification Search ................ 423/539, 423/543, 522, 529, 659, DIG. 5, DIG. 6
    See application file for complete search history.

(56) References Cited

U.S. PATENT DOCUMENTS

| 1,904,512 | A | * | 4/1933 | Nordlander ................. 423/543 |
| 2,310,173 | A | * | 2/1943 | Chatelain et al. ........... 423/543 |
| 3,644,092 | A | * | 2/1972 | Campbell .................... 423/543 |
| 3,723,068 | A | * | 3/1973 | McIlroy et al. ............. 422/161 |
| 3,803,297 | A | * | 4/1974 | Guth et al. .................. 423/533 |
| 3,803,298 | A | * | 4/1974 | Guth et al. .................. 423/543 |
| 4,421,734 | A | * | 12/1983 | Norman ................... 423/658.2 |
| 4,578,262 | A | * | 3/1986 | Cameron .................... 423/522 |
| 5,194,239 | A | * | 3/1993 | Masseling et al. .......... 423/522 |
| 5,204,082 | A |   | 4/1993 | Schendel |
| 5,791,268 | A | * | 8/1998 | Battles et al. ............... 110/345 |
| 6,045,770 | A |   | 4/2000 | Batttles et al. |
| 6,875,413 | B1 | * | 4/2005 | Perez Garcia .............. 423/543 |

OTHER PUBLICATIONS

Koichi; "Apparatus for Producing High-Purity Sulfur Dioxide"; Patent Abstracts of Japan, of JP 09-309707, Dec. 2, 1997.
Bayer AG (DE); "Manufacture of Sulfur Dioxide"; Abstract of JP 58026011.

* cited by examiner

Primary Examiner—Stanley S. Silverman
Assistant Examiner—Ardith E Hertzog
(74) Attorney, Agent, or Firm—Finnegan, Henderson, Farabow, Garrett & Dunner, L.L.P.

(57) ABSTRACT

A method for the automated production of liquid $SO_2$ having a purity above 99.9% from elemental sulfur and pure oxygen, in the presence of $SO_2$ recirculated from a closed circuit production system. The temperature of the combustion is controlled by means of pre-defined S, $O_2$ and $SO_2$ ratios. The automation is made based on oxygen sensors and on sulfur and $SO_2$ flow meters with their respective control connections and proportional valves permitting a fine control of the sulfur combustion reaction. Liquefaction of gaseous $SO_2$ produced is carried out alternatively by a cool plant working between −10 and −60° C. or with a compression unit working at a pressure between 3.8 and 5.0 bar. The automation permits an optimum temperature control and a clean production of $SO_2$.

20 Claims, 4 Drawing Sheets

METHOD FOR THE AUTOMATED MANUFACTURE OF PURE SO2 FROM SULFUR AND OXYGEN

Obtaining $SO_2$ from elemental sulfur is a process widely used in the industry. Nevertheless, when a high purity product in industrial amounts and furthermore not polluting the environment is required; the processes fulfilling these requirements are either for small productions, they inevitably produce pollution or they require many purification unit operations, due to the use of air or hydrocarbons as comburent agent or sulfur to oxidize as a liquid.

The process described in present invention corresponds to an oxidation overcoming the aforementioned general limitations and further carrying out a control of the energy and the purification unit operations better than those standard known ones.

U.S. Pat. No. 5,204,082 by Schendel (1993) describes a method for preparing high purity $SO_2$ based on the submerged combustion of elemental sulfur in liquid state, using both air and pure oxygen. This method has the inconvenient of trailing particles of unburned sulfur from the liquid sulfur present both as a reagent and as a solvent. Thus the method uses different unit operations for removing these particles of sulfur trailed from the combustion phase.

This combustion has the characteristic of having excess of sulfur relative to the reaction air or oxygen, producing a combustion generating side reactions of the sulfur giving reaction by-products; the main purpose of the method is to remove the sulfur from the combustion gases for purifying the $SO_2$ without considering the gases other than $SO_2$.

Therefore it is necessary to carefully control the melted sulfur temperature because the variation of its viscosity with the temperature, in order to avoid the difficulties in the liquid sulfur flow being burnt. In other words, this submerged combustion has the characteristic of requiring a good control of liquid sulfur temperature and its subsequent recycling for obtaining high purity without major concern of gaseous by-products produced together with $SO_2$.

U.S. Pat. No. 6,045,770 by Battles (2000) describes the preparation of $SO_2$ from granulated or emulsified sulfur, by oxidation with air in a sulfur combustion furnace. The reaction from a sulfur emulsion consisting in a suspension of sulfur (70%) in water (30%) with sulfur particles of 4–6 µm is carried out in a sulfur burner atomizing it to sulfur frog or mist for its combustion in a sulfur furnace. The moisture during the combustion generates sulfuric acid as a significant polluting agent from the process.

As sulfur powder can explode, the combustion with granulated sulfur requires an inert gas such as nitrogen or $CO_2$ serving as inert medium or diluent agent of the combustion reagents, thus avoiding an eventual lack of control not only of the temperature but also of the combustion products types.

The processes of submerged combustion and of combustion of atomized sulfur with air, described above, have the characteristic of requiring a safe control of the liquid sulfur temperature due to its abrupt viscosity variations with the temperature; furthermore, the sulfur sublimates and forms crystals when condensing, so as the sulfur storage tanks require to be properly protected against these temperature changes.

The industrial solid sulfur normally is also accompanied by traces of hydrogen sulfide, $H_2S$, or of hydrocarbons being constituents of the sulfur source and emitted to the atmosphere transformed after the combustion.

JP Patent 58026011 by Chibooru B. (Bayer AG, 1983) uses the sulfur combustion with oxygen at 1000–1100° C. adding sulfuric acid of 20 to 90% concentration, instead of 800–1300° C. required without adding sulfuric acid. Nevertheless, the purity of the $SO_2$ produced is not high, specially when for this low temperature it is required further addition of hydrocarbons as fuel compensating the lower temperature.

JP Patent 09-309707 by Araki K. (Mitsubishi Heavy Ind. Ltd., 1997) describes an equipment to produce high purity $SO_2$, based on the combustion of solid sulfur with oxygen or with oxygen enriched air. The combustion gases are cooled with $H_2O$; the $SO_3$ is removed with a humid type electric powder collector and a gas separator for removing the unreacted $O_2$, $CO_2$ and $N_2$, in its case. Nevertheless, this system requires various purification steps to obtain a high purity $SO_2$.

These patents allow one to appreciate that all the described processes require working with the impurities produced in the sulfur oxidation, or combustion, in order to arrive at a process offering pure $SO_2$.

The present invention permits one to avoid not only the critical control of the oxidation temperature itself, but to simplify the unit operations as the combustion with pure oxygen, diluted with $SO_2$ produced in the system itself as a closed system, makes its advantages clear for any one skilled in the art, the thermically autocontrolled oxidation producing high purity $SO_2$. The automation introduced in this invention allows not only a better control of the process, but also a production of variable capacity.

DESCRIPTION OF THE INVENTION

The $SO_2$ automated production system described in the present invention corresponds to the plant automated control based on oxygen sensors and on oxygen and sulfur flow sensors. Furthermore, this description shows how by varying the amounts of liquid $SO_2$ or final product, the flows of oxygen, sulfur and unliquified return $SO_2$ vary under control.

Accordingly, a description of the process carried out for an amount of 5 to 30 tons per day will be provided taking into account that for amounts above 30 tons per day a burner having larger capacity is required.

Figure 1:
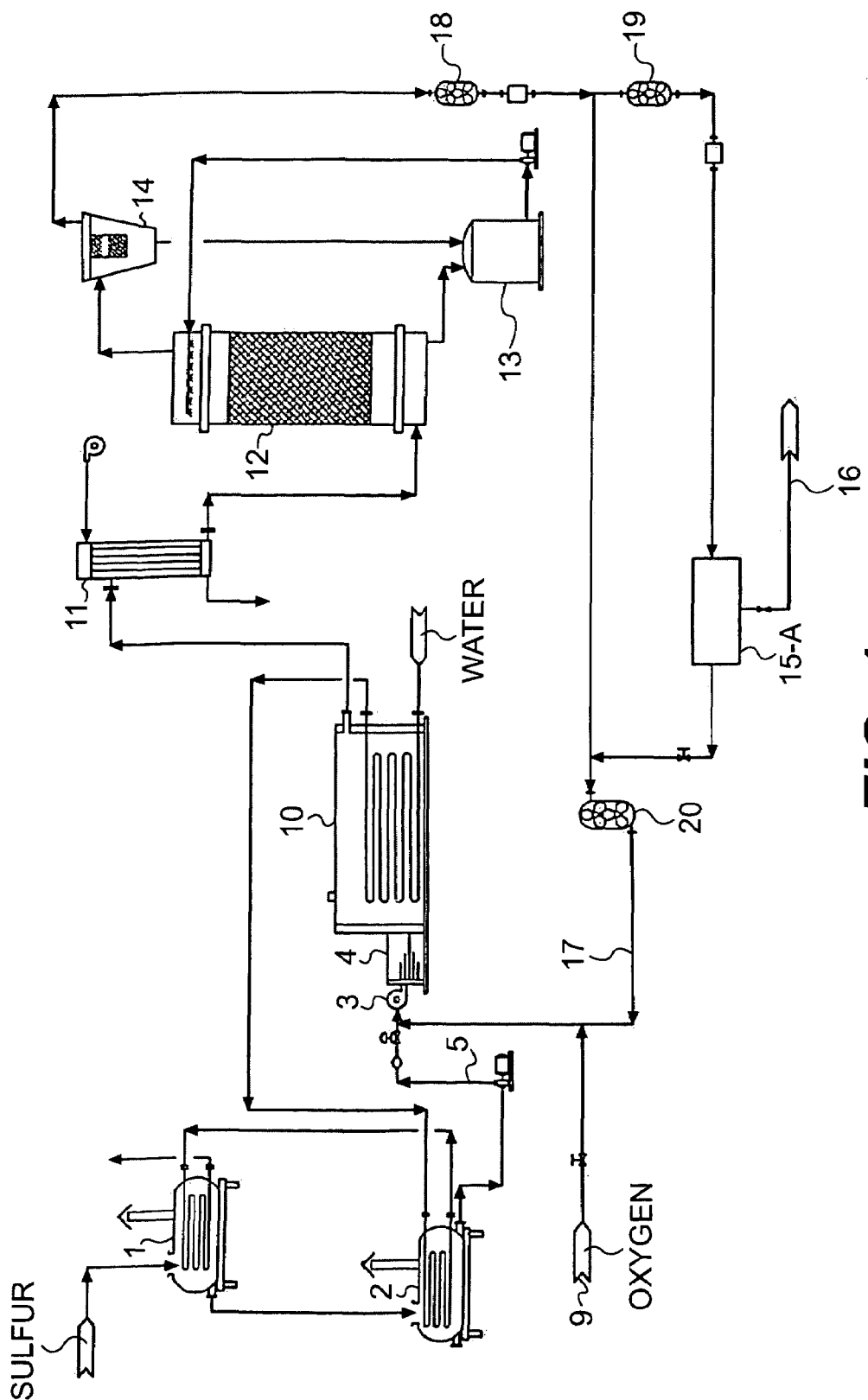
FIG. 1 is a flowsheet representation showing the system of production of $SO_2$ from the sulfur feed to the final $SO_2$ exit and the back of the latter as diluent and cooling agent of the oxidation reaction, with liquefaction by a cooling plant.
Figure 2:
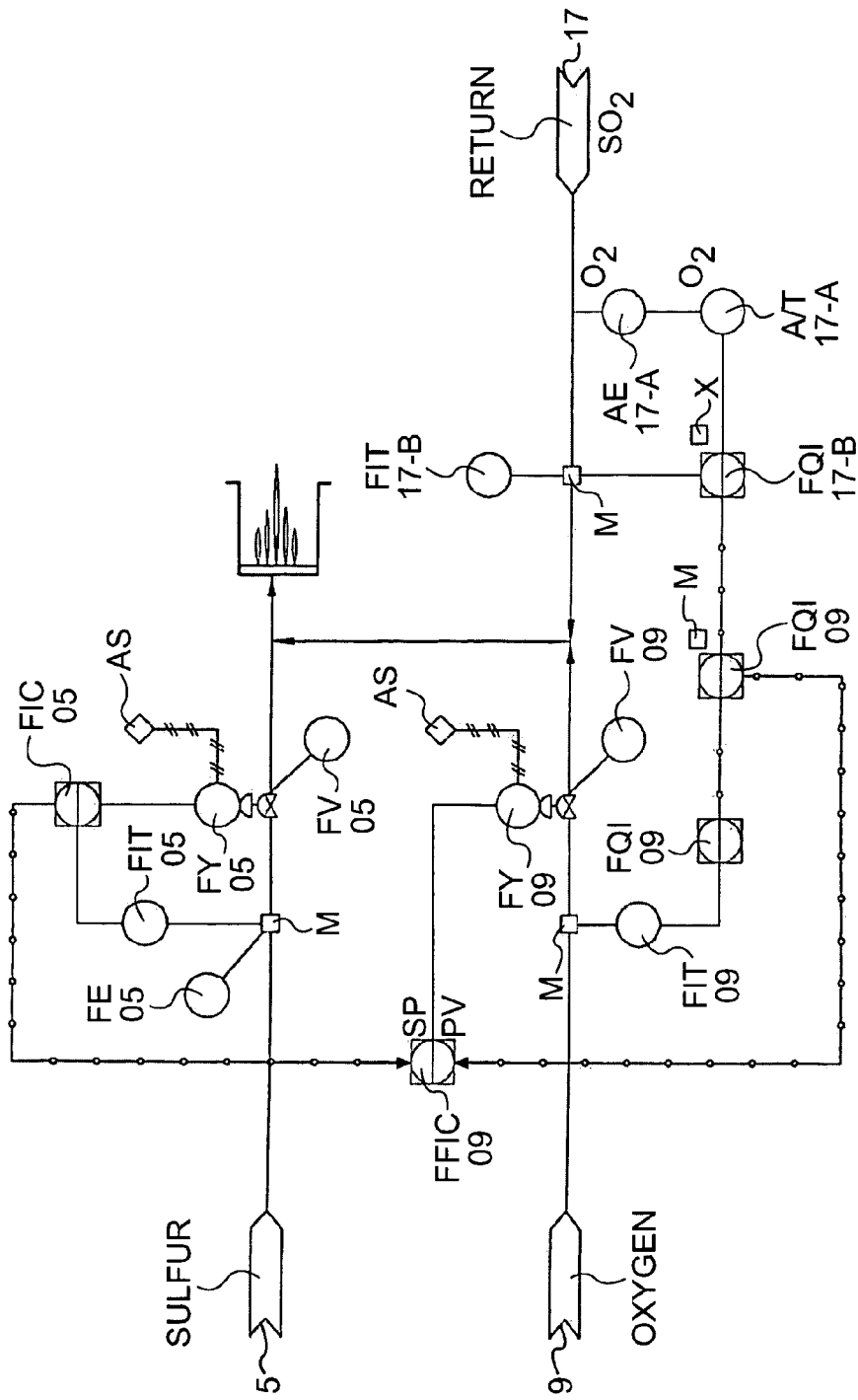
FIG. 2 represents a detailed description of the electronic circuit of the automated control, wherein each sensor involved is described as follows: liquid sulfur flow sensor, pure oxygen flow sensor, return $SO_2$ flow sensor, oxygen transmission sensor, sulfur transmission sensor, return oxygen indicator sensor, each sensor or indicator has associated therewith an electronic component and a transmitter, all of these signals being transmitted to a PLC, wherein the control connection function associated with all of the control elements allows to maintain the system operating automatically according to the predefined parameters of the sulfur combustion.
Figure 3:
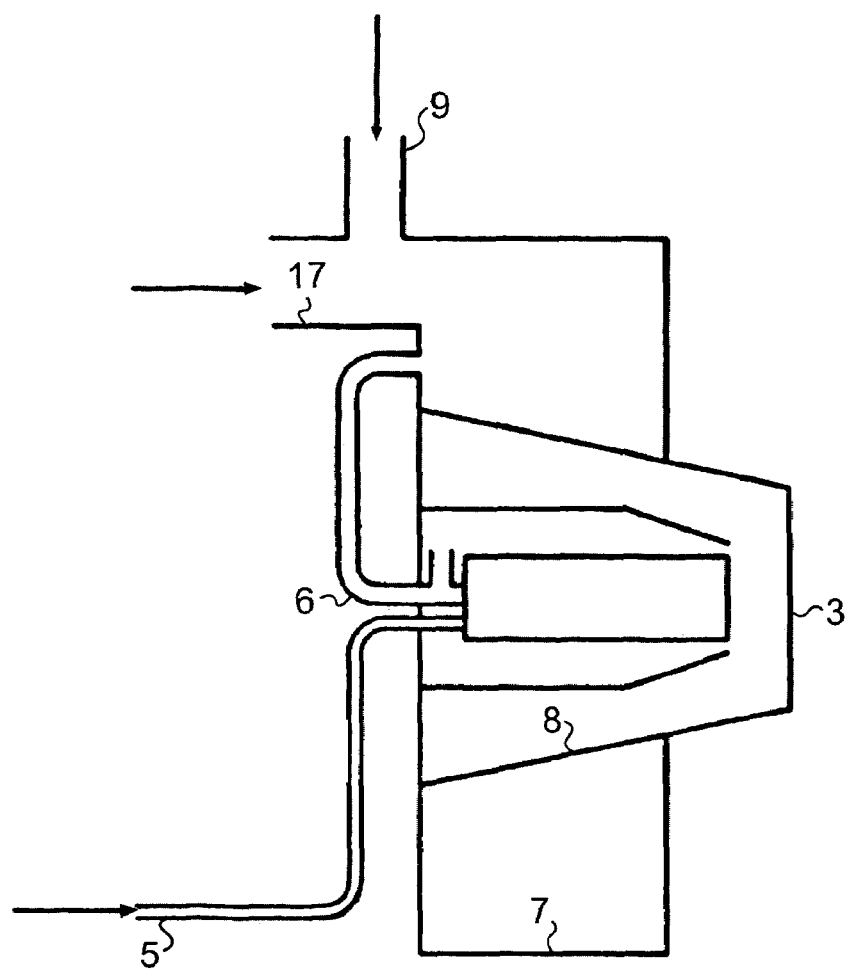
FIG. 3 is a schematic diagram of the burner showing the admissions and the distribution of the comburent gas, as primary (6), secondary (7) and tertiary (8) gas used for the controlled combustion of the atomized sulfur.
Figure 4:
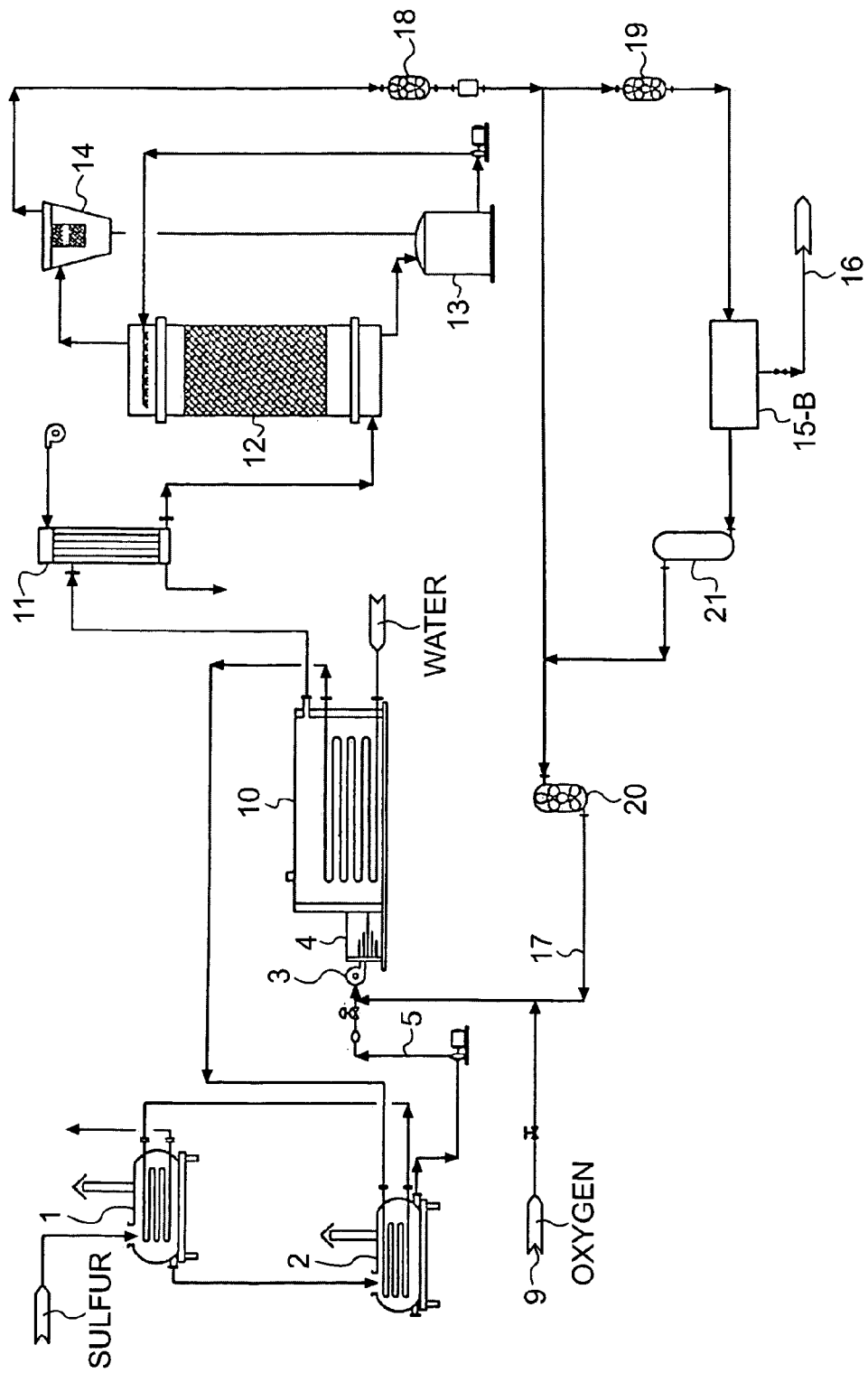
FIG. 4 shows the production plant of $SO_2$ with the system of liquefaction by compression (15).

The description of the process is made with reference to the general flowsheet shown in FIG. 1. The incorporation of sensors for oxygen, for the sulfur flow and for the $SO_2$ flow is shown in FIG. 2 specifically representing these components of the process. The features of the combustion are made by reference to FIG. 3 representing the structure of the burner with its atomizer for a production capacity not higher than 30 tons per day. For higher productions only the change of the burner and a combustion chamber suitable for said capacity are required. On the other hand, FIG. 4 represents the liquefaction system of the $SO_2$ produced by compression as an alternative to the system of liquefaction only by cooling.

FIG. 2 represents in detail the control diagram of the automated process. FIG. 2 shows the following elements:
sulfur flow 5.
FE 05 sulfur flow sensor.
FIT 05 transmission sensor indicator of sulfur flow.
FV 05 sulfur flow valve.
FY 05 electronic component FV 05 valve for sulfur.
FIC 05 control connection function (PLC software) for the control of sulfur flow.
oxygen flow 9.
AE 17A oxygen sensor.
FIT 09 transmission sensor indicator of oxygen flow.
FV 09 proportional control valve for oxygen flow.
FY 09 electronic component FV 09 valve for oxygen.
FQI 17B transmission sensor indicator of return $SO_2$ flow.
FQI 17(B) control connection function (PLC software) return $SO_2$ flow.
AIT 17A transmission sensor indicator of return oxygen.
FQI 09 (m) control connection function (PLC software) for the control of oxygen flow between oxygen in $SO_2$ return and pure oxygen.
FQI 09 control connection function (PLC software) for the control of pure oxygen flow.
FFIC 09 control connection function (PLC software) for the control of oxygen flow.
M: flow meter.
SP: set point.
AS: pneumatic signal (dry air) by means of the valves FV 05 y FV 09 are operated.

Thus, according to the details of FIGS. 1 to 4, a 170 kg/h flow of sulfur in solid or liquid state is entered into the storage tank (1) and then maintained at a temperature of 125–130° C. with the steam produced following the combustion chamber (4) in a multistep heat exchanger (10) of this process. This sulfur enters into the feed sulfur (2) maintained at a temperature from 130 to 135° C. with the same steam produced after the combustion of the sulfur in the multistep heat exchanger (10); this steam is the same that, after transferring part of its heat to the feed sulfur (2) is carried to the storage tank (1). These two steps have the purpose of maintaining the sulfur in liquid state for its handling and for removing the impurities proper of the delivery, in particular the most heavy ones, and the moisture.

The feed sulfur is maintained liquid in the range of 130–135° C. in the feed sulfur (2) and therefrom is fed to the burner (3), represented in detail in FIG. 3, with a standard fluid pump through the sulfur enterance (5), as at this temperature it offers no problem of viscosity. In this temperature range, the viscosity is lower than 10 mPa/s. As an antecedent, the sulfur under 160° C. rapidly increases its viscosity to reach values of 80,000 mPa/s at 190° C. The liquid sulfur is introduced in the burner (3) being part of the combustion chamber (4).

FIG. 3 shows in detail the structure of the burner (3). The $SO_2$ return (17) containing oxygen non consumed from previous oxidation is enter into this burner; pure oxygen (9) is added to this $SO_2$ before entering into the burner thus forming the fuel with $SO_2$ as diluent and cooling agent.

The liquid containing sulfur is put up with the sulfur entrance (5) through the central back part of the burner (3) and through another also back entrance, parallel to the sulfur entrance (5), the $O_2$ enriched return $SO_2$ called "primary gas" (6) is entered (FIG. 3). The primary gas is the one introduced in wrapping form with the liquid sulfur which is then pulverized by effect of the high speed of the mobile cup of the atomizer in the burner producing microdrops. This mixture of $SO_2$, oxygen and finely pulverized sulfur in microdrops leaves the rotatory cup of the atomizer and enters into the combustion chamber (4) where the sulfur oxidative combustion step occurs transforming the sulfur into pure $SO_2$ by the action of oxygen being part of the combustion gas and called tertiary gas (8).

The rest of the return flow internally wraps the burner acting as cooler and thermally isolating all the front of the burner, and it is called secondary gas (7); in said function, the gas is thus pre-heated in the inner of the combustion chamber (4) wherein it dilutes and cools the total mass produced in the combustion. This is the tertiary gas (8) therewith the temperature does not exceed 1231° C. in the combustion chamber due to the diluting and cooling effect of the $SO_2$.

This temperature control in the combustion chamber (4) is reached by a suitable handling of the $SO_2$ return gases (17) by means of the automation based on the return oxygen; therewith a temperature above 1144° C.±50° C. and lower than 1231° C. is reached. In said conditions, the process is easily controlled resulting in a high purity $SO_2$.

The combustion gases at the temperature of 1167±50° C. are following passed through a multistep heat exchange (10) with water shown in FIG. 1, and steam is produced at a temperature range of 145–160° C. mainly used for maintaining in liquid state the feed sulfur (2) entering into the burner (3) and the storage tank (1). The steam excess produced can be used for other heat exchange unit operations in an industrial chemical plant.

The effluent of the sulfur to $SO_2$ conversion, leaving the multistep heat exchanger at a temperature above or equal to 192° C., is treated in a heat exchanger with atmospheric air (11), so as when leaving it, the combustion gas temperature is 85±5° C.

The gases pass then into a tower (12) removing $SO_3$ and the moisture that eventually could enter into the system through tank (13), with concentrated 98% $H_2SO_4$ at 30° C. This tower is provided with a sulfuric acid drop trap (14) so as the gases passing therein essentially comprise $SO_2$ and $O_2$ unreacted in the combustion chamber.

The whole mass of gases from the combustion chamber is moved by means of a blower (18) and the mass entering into the cooling plant is moved with the blower (19); the mass returning to the combustion chamber is moved with the blower (20).

From the total mass moved by the blower (18) up to a 30% is circulated to the cooling plant (15A) by means of the blower (19). This cooling plant works at a temperature from −30 to −60° C. From this gas fraction, a high part is liquefied and comprises the $SO_2$ as final product (16) and the other cooled part comprises essentially $SO_2$ and $O_2$; both gases re-enter into the system through the blower (20). This return $SO_2$ (17) comprising about the 80% of the total $SO_2$ flow is driven to the combustion chamber (4) but, before entering thereinto it is mixed with the pure oxygen (9) in order to form the comburent mixture entering into the combustion burner.

Thus the produced $SO_2$ participates in a closed system or circuit for acting then as diluent and cooling agent of the elemental sulfur oxidation.

As an alternative to the aforementioned process of $SO_2$ liquefaction by cooling, the also efficient way of liquefaction by means of a compressor working between 3.8 and 5.0 bar of pressure together with cooling by water allowing an easy controlled liquefaction can be used. This is shown in FIG. 4 wherein it can be appreciated an automated $SO_2$ production plant producing liquid $SO_2$ by compression with its compression unit (15B) and the lung tank (21). The non compressed gases return to the recycling system through the lung tank, therefrom a blower (20) integrates it to the rest of the $SO_2$ returning to the combustion chamber (4).

It must be pointed out that the above described method always works in the absence of nitrogen (the oxidant agent is pure oxygen) different to other industrial systems for the production of $SO_2$. The storage tank (1) wherein the sulfur is maintained liquefied between 125–130° C., is provided with a funnel with chimney and forced air extraction permitting to evacuate the moisture and the nitrogen present in the sulfur, thus all non desired possible nitrogen impurity is removed in the closed circuit system that the plant has at the moment of burning the sulfur.

The start point of the process in the plant is initiated with a scavenging with pure oxygen of the whole closed circuit for removing all traces of nitrogen and other gases accompanying the air which eventually could contaminate the liquefied $SO_2$ production. This sweep with oxygen is thrown to the atmosphere through the cooling plant or the compression plant if that alternative of liquefaction is used, before initiating the combustion process and the $SO_2$ liquefaction. Thus, the $SO_2$ production method is free of the presence of nitrogen or other gas different from pure oxygen.

The chemical analysis of sulfur allows to include as a significant impurity thereof, aromatic polycyclic hydrocarbons, detected by extracting with acetonitrile and by UV an HPLC as standard analysis technique. Analyses of $SO_2$ produced at the exit of the cooling plant are also carried out, the maximum impurity of $SO_2$ corresponding to traces of sulfonated polycyclic hydrocarbons; the sulfonation occurs after the sulfur in oxidation passes by the combustion chamber. The analyses show that the impurity does not exceed 0.05%, without discarding the eventual presence of moisture and $H_2SO_4$ in parts per million.

As can be appreciated, the control logic is based on the regulation of the $O_2$ flow at the entrance of the burner based on the S flow and the $SO_2$ being the cooling and diluent agent of the reaction. The control is carried out by modifying the amount of $O_2$ so as to have a constant $O_2$:S ratio in function of the returned $O_2$ together with the $SO_2$ with a light excess not exceeding the 5% of the stoichiometric one.

The flows involved in the control, represented in FIG. 2, are:

| F05: | S flow. |
|------|---------|
| F09: | $O_2$ flow. |
| F17: | cooling/diluent flow. |

For measuring the S flow (F 05), a sonic type flow sensor (FE/FIT-05) is used. The $O_2$ flow, F09, is measured in the same manner and the flow of the returned $SO_2$ F17 is measured with FIT-09) and FIT-17B) rotamers, respectively. The sulfur flow is adjusted by the proportional valve FV-05 and the $O_2$ is controlled with a proportional valve FV-09. The content or concentration of $O_2$ in the F17 flow is measured by a $O_2$ sensor (AE/AIT-17A).

The first control connection consists in the regulation of the S flow (F05)to the burner by a sulfur flow meter and the proportional control valve FV-05.

The second connection control consists in the regulation of the $O_2$ flow by a flow meter and the proportional control valve FV-09. The adjustment of the flow is carried out such as to maintain constant the $S:O_{2(total)}$ ratio. The total $O_2$ is obtained from the addition of pure $O_2$ plus the return $O_2$, the latter being calculated by the flow sensor 17B and the $O_2$ analyzer 17A.

The control system allows the adjustment of the oxygen up to a maximum of 5% excess on the stoichiometric one.

The sulfur oxidation reaction or combustion is previously evaluated in order to know the amounts and proportions of the reactants to be mixed for their reaction; this is carried out with the HSC reaction simulated program of Outokumpu™. This program provides the reaction temperature reached in the combustion chamber for different $O_2$, S and $SO_2$ mass ratios of the oxidation closed circuit in different mixtures.

For example, for:

if the reactants and return $SO_2$ masses are that following indicated, the predicted reaction temperature is the included in the fourth column of the following Table.

| S (g) | $O_2$ (g) | $SO_2$ (g) | T (° C.) |
|-------|-----------|------------|----------|
| 32.00 | 32.64 | 0 | 5018.8 |
| 32.00 | 33.60 | 0 | 5018.7 |
| 32.00 | 32.63 | 243.42 | 1211.56 |
| 32.00 | 33.60 | 243.42 | 1211.53 |
| 32.00 | 32.63 | 256.23 | 1167.57 |
| 32.00 | 33.60 | 256.23 | 1167.55 |
| 32.00 | 32.63 | 262.64 | 1146.88 |
| 32.00 | 33.60 | 262.64 | 1146.75 |

The temperature reached in the combustion chamber mainly depends on the $S:O_2:SO_2$ ratio and not so much on the temperature of the fuel entering into the burner; if the temperature of the $SO_2$ entering into the burner is variable, the reaction temperature is the one indicated for the ratio, expressed in grams, as follows:

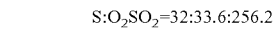

| Temperature of the return $SO_2$ | Reaction temperature |
|----------------------------------|---------------------|
| 0° C. | 1164.77° C. |
| 15° C. | 1167.55° C. |
| 30° C. | 1175.93° C. |
| 50° C. | 1187.28° C. |

The above description with the features of the oxidation process itself without gases generating byproducts, such as nitrogen, and only with pure oxygen diluted with $SO_2$ produced in the closed circuit system; the $SO_2$ high purity controlled by analysis before and after the combustion; its stepping for different production capacities; the different routes for obtaining liquid $SO_2$ either by cooling or compression; as well as the oxidation process computer simulation indicate for any skill in this area of processes that the system offers significant advantages relating to the state of the technique not automated and not working under closed circuit such as the one described in present patent application.

The automated control of the flows of sulfur and oxygen carried out based on the return oxygen, is the base of the efficiency of the process for obtaining high purity liquefied $SO_2$ in safe manner free of any environmental contamination.

The invention claimed is:

1. An automatic method for the production of $SO_2$ from the combustion of elemental sulfur and pure oxygen, comprising the steps of:
    feeding liquid sulfur into an atomizer in a burner;
    atomizing the liquid sulfur in the burner together with return $SO_2$ and pure oxygen; and
    producing oxidative combustion of the liquid sulfur and the pure oxygen in a combustion chamber to produce $SO_2$ in the presence of the return $SO_2$, wherein the return $SO_2$ is used as a cooling and diluting agent for the reactants taking part in the oxidative combustion in the combustion chamber, oxygen not consumed during the oxidative combustion is returned to the combustion chamber together with the return $SO_2$ to be reused, and the temperature of the oxidative combustion of the liquid sulfur does not exceed 1250° C., wherein the temperature is controlled by automatically controlling a defined ratio of S, $O_2$ and $SO_2$, by measuring and controlling with respective flow sensors the flow of return oxygen, the flow of return $SO_2$ and $O_2$, the flow of the pure oxygen and the flow of the liquid sulfur to the chamber.

2. The automatic method for the production of $SO_2$ according to claim 1, wherein the $SO_2$ produced has a purity above 99.90%.

3. The method for the production of $SO_2$ according to claim 2, wherein the sulfur content of the $SO_2$ produced is under 2 ppm.

4. The automatic method for the production of $SO_2$ according to claim 3, wherein the greatest impurity in the final $SO_2$ produced in a liquefied state corresponds to the polycyclic aromatic hydrocarbons contained in the original sulfur and do not exceed 0.05% by weight.

5. The automatic method for the production of $SO_2$ according to claim 4, wherein the aromatic hydrocarbons of the impurities are sulfonated after the sulfur oxidation.

6. The automatic method for the production of $SO_2$ according to claim 1, wherein regulation of pure oxygen entering as a reactant into the combustion chamber is carried out in the flow sensor that measures the oxygen returning to the combustion chamber, after steps of purifying and cooling of the $SO_2$ produced.

7. The automatic method for the production of $SO_2$ according to claim 6, wherein the regulation of the pure oxygen added to the return oxygen before entering into the combustion chamber is carried out based on a proportional valve controlled by the return oxygen flow sensor.

8. The automatic method for the production of $SO_2$ according to claim 7, wherein the amount of oxygen entering into the combustion chamber is controlled to be at a 2%–5% excess relating to the stoichiometric value of S and $O_2$.

9. The automatic method for the production of $SO_2$ according to claim 1, wherein between 20% and 30% of the $SO_2$ produced and remaining unreacted oxygen are cooled in a cooling liquefaction unit, operating at a temperature of between −10 and −60° C., to liquefy the $SO_2$ into liquid $SO_2$.

10. The automatic method for the production of $SO_2$ according to claim 9, wherein the liquefaction of the $SO_2$ is favored by the absence of an uncontrolled excess of oxygen mass and a higher concentration of gaseous $SO_2$.

11. The automatic method for the production of $SO_2$ according to claim 9, wherein up to 80% of the $SO_2$ as a total volume not passing through the liquefaction unit is sent back as the cooling and diluting agent to the burner of the combustion chamber.

12. The automatic method for the production of $SO_2$ according to claim 1, wherein an $S:O_2:SO_2$ ratio, expressed in grams, entering into the combustion chamber in the range of from 32:32.63:243.42 to 32:333.6:262.64.

13. The automatic method for the production of $SO_2$ according to claim 12, wherein the $S:O_2:SO_2$ ratio, expressed in grams, entering into the combustion chamber is about 32:32.63:256.23.

14. The automatic method for the production of $SO_2$ according to claim 1, wherein the combustion chamber is maintained at a temperature higher than 1100° C. and lower than 1250° C.

15. The automatic method for the production of $SO_2$ according to claim 14, wherein the combustion chamber is maintained at a temperature of about 1167.5° C.

16. The automatic method for the production of $SO_2$ according to claim 1, wherein the return $SO_2$ corresponds to at most 80% of the $SO_2$ produced in the oxidation of the sulfur.

17. The automatic method for the production of $SO_2$ according to claim 1, wherein the $SO_2$ produced contains $SO_3$ which is absorbed in counter current flow in a 98% $H_2SO_4$ tower.

18. The automatic method for the production of $SO_2$ according to claim 1, wherein liquid sulfur enters into the combustion chamber at a temperature of between 130 and 135° C., which temperature is maintained by steam produced in a multistep heat exchanger post-combustion chamber.

19. The automatic method for the production of $SO_2$ according to claim 1, wherein the oxidative combustion is produced from the liquid sulfur in a pulverized microdrop state produced in the atomizer of the burner.

20. The automatic method for the production of $SO_2$ according to claim 1, wherein between 20% and 30% of the $SO_2$ produced and remaining unreacted oxygen are cooled in a compression cooling liquefaction unit, operating at a pressure of between 3.8 and 5.0 bar, and a water cooler to maintain them under 32° C., to liquefy the $SO_2$ into liquid $SO_2$.

* * * * *